(12) United States Patent
Park et al.

(10) Patent No.: US 12,031,024 B2
(45) Date of Patent: Jul. 9, 2024

(54) THERMOPLASTIC RESIN COMPOSITION AND MOLDED ARTICLE THEREBY

(71) Applicant: LG CHEM, LTD., Seoul (KR)

(72) Inventors: Chun Ho Park, Daejeon (KR); Tae Hoon Kim, Daejeon (KR); Daeun Sung, Daejeon (KR); Yong Hee An, Daejeon (KR); Wangrae Joe, Daejeon (KR); Ho Hoon Kim, Daejeon (KR); Jeongmin Jang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 340 days.

(21) Appl. No.: 17/764,633

(22) PCT Filed: Dec. 18, 2020

(86) PCT No.: PCT/KR2020/018705
§ 371 (c)(1),
(2) Date: Mar. 29, 2022

(87) PCT Pub. No.: WO2022/019410
PCT Pub. Date: Jan. 27, 2022

(65) Prior Publication Data
US 2022/0332936 A1    Oct. 20, 2022

(30) Foreign Application Priority Data
Jul. 23, 2020  (KR) ......................... 10-2020-0091651

(51) Int. Cl.
*C08L 51/04* (2006.01)
*B29B 9/06* (2006.01)
(Continued)

(52) U.S. Cl.
CPC ................ *C08L 51/04* (2013.01); *B29B 9/06* (2013.01); *B29C 48/09* (2019.02); *B29C 48/151* (2019.02);
(Continued)

(58) Field of Classification Search
CPC .. C08L 51/04; C08L 2201/08; C08L 2203/18; C08L 2205/025; C08L 2205/035;
(Continued)

(56) References Cited

U.S. PATENT DOCUMENTS

2004/0086672 A1   5/2004  Yoshino
2006/0094822 A1   5/2006  Gaggar et al.
(Continued)

FOREIGN PATENT DOCUMENTS

CN    101407617 A    4/2009
CN    106519530 A    3/2017
(Continued)

OTHER PUBLICATIONS

First Office Action dated Mar. 12, 2024 from the Taiwanese Patent Office corresponding Taiwanese Patent Application No. 109146646.
(Continued)

*Primary Examiner* — James C Yager
(74) *Attorney, Agent, or Firm* — Morgan, Lewis & Bockius LLP (57) ABSTRACT

A thermoplastic resin composition and a molded article including the same can include 100 parts by weight of a base resin including 10 to 50% by weight of an acrylate-aromatic vinyl compound-vinyl cyanide compound graft copolymer (A-1) containing acrylate rubber having an average particle diameter of 0.3 to 0.5 μm, 5 to 40% by weight of an acrylate-aromatic vinyl compound-vinyl cyanide compound graft copolymer (A-2) containing acrylate rubber having an average particle diameter of 0.05 μm or more and less than 0.3 μm, and 20 to 65% by weight of an aromatic vinyl polymer (B), and 0.5 to 12 parts by weight of a polyamide (C). The thermoplastic resin composition can have a solvent resistance of 15 days or more.

16 Claims, 2 Drawing Sheets

CENTRAL PORTION
SPRAY APPLICATION

LOWER PORTION
IMMERSION (51) Int. Cl.
  *B29C 48/09*    (2019.01)
  *B29C 48/151*   (2019.01)
  *B32B 1/08*     (2006.01)
  *B32B 15/18*    (2006.01)
  *B32B 27/08*    (2006.01)
  *F16L 9/147*    (2006.01)
  *B29K 96/02*    (2006.01)
  *B29K 705/00*   (2006.01)
  *B29L 23/00*    (2006.01)

(52) U.S. Cl.
  CPC ............... *B32B 1/08* (2013.01); *B32B 15/18* (2013.01); *B32B 27/08* (2013.01); *F16L 9/147* (2013.01); *B29K 2096/02* (2013.01); *B29K 2705/00* (2013.01); *B29L 2023/22* (2013.01); *C08L 2201/08* (2013.01); *C08L 2203/18* (2013.01); *C08L 2205/025* (2013.01); *C08L 2205/035* (2013.01); *C08L 2207/04* (2013.01); *Y10T 428/1352* (2015.01); *Y10T 428/1355* (2015.01); *Y10T 428/1386* (2015.01); *Y10T 428/1393* (2015.01)

(58) Field of Classification Search
  CPC .. C08L 2207/04; C08L 2205/03; C08L 25/16; C08L 25/12; C08L 25/06; C08L 77/02; C08L 77/06; C08L 33/12; B29B 9/06; B29B 7/007; B29B 9/12; B29B 7/726; B29B 7/48; B29B 9/10; B29C 48/151; B29C 2948/9258; B29C 48/08; B29C 48/305; B29C 48/92; B29C 48/04; B29C 48/16; B32B 1/08; B32B 15/18; B32B 27/08; F15L 9/04; F15L 9/147; B29K 2096/02; B29K 2705/00; B29L 2023/22; Y10T 428/1352; Y10T 428/1355; Y10T 428/1386; Y10T 428/1393
  See application file for complete search history.

(56) References Cited

U.S. PATENT DOCUMENTS

| | | |
|---|---|---|
| 2006/0148992 A1 | 7/2006 | Kim et al. |
| 2015/0291793 A1 | 10/2015 | Minkwitz et al. |
| 2017/0369692 A1 | 12/2017 | Park et al. |
| 2019/0023892 A1 | 1/2019 | Kang et al. |
| 2020/0148872 A1 | 5/2020 | Schulz et al. |
| 2021/0024735 A1 | 1/2021 | Park et al. |
| 2022/0010122 A1 | 1/2022 | Sung et al. |

FOREIGN PATENT DOCUMENTS

| | | | |
|---|---|---|---|
| CN | 108473748 | A | 8/2018 |
| CN | 113166520 | A | 7/2021 |
| DE | 41 14 589 | A1 | 11/1992 |
| JP | H02153968 | A | 6/1990 |
| JP | 2002179866 | A | 6/2002 |
| JP | 2002283428 | A | 10/2002 |
| JP | 2005-200509 | A | 7/2005 |
| KR | 10-0509868 | B1 | 8/2005 |
| KR | 10-2009-0095764 | A | 9/2009 |
| KR | 10-2013-0075793 | A | 7/2013 |
| KR | 10-2014-0096037 | A | 8/2014 |
| KR | 10-2015-0068313 | A | 6/2015 |
| KR | 10-2015-0069888 | A | 6/2015 |
| KR | 10-2017-0066103 | A | 6/2017 |
| KR | 10-1974164 | B1 | 4/2019 |
| KR | 10-2019-0114898 | A | 10/2019 |
| TW | 200630206 | A | 9/2006 |

OTHER PUBLICATIONS

Office Action issued Nov. 24, 2023 for corresponding Chinese Patent Application No. 202080067915.8 Citation: KR 10-2015-0069888 A & KR 10-1974164 B1 are of record.
Extended European Search Report issued in corresponding International Patent Application No. 20945742.3, dated Nov. 4, 2022.
First Office Action issued in corresponding JP Application No. 2022-521340, dated Apr. 17, 2023. (US 2006/0094822 A1 and KR 10-2015-0069888 A cited therein have been cited in an earlier-filed SB08.).
International Search Report and Written Opinion issued in corresponding International Patent Application No. PCT/KR2020/018705, dated Apr. 16, 2021.

[FIG. 1]

CENTRAL PORTION SPRAY APPLICATION  LOWER PORTION IMMERSION

[FIG. 2]

GOOD　　FINE CRACKS　　MEDIUM CRACKS　　CRACKS

[FIG. 3]

THERMOPLASTIC RESIN COMPOSITION AND MOLDED ARTICLE THEREBY

TECHNICAL FIELD

Cross-Reference to Related Application

This application claims priority to Korean Patent Application No. 10-2020-0091651, filed on Jul. 23, 2020 in the Korean Intellectual Property Office, the disclosure of which is incorporated herein by reference.

The present invention relates to a thermoplastic resin composition and a molded article including the same. More particularly, the present invention relates to a thermoplastic resin composition that allows implementation of various colors without deterioration in mechanical properties and processability and prevents discoloration and cracks due to excellent solvent resistance and chemical resistance thereof and a molded article including the thermoplastic resin composition. With these properties, the thermoplastic resin composition is suitable for industrial carts.

BACKGROUND ART

Currently, in manufacture of industrial carts exposed to various chemicals, a non-painting method of coextruding steel/plastic is mainly used rather than a method of painting steel pipes.

Acrylate compound-styrene-acrylonitrile copolymers (hereinafter referred to as "ASA resins") have excellent weather resistance, aging resistance, chemical resistance, rigidity, impact resistance, and processability, and thus have been used in various fields, such as automobiles, miscellaneous goods, and construction materials.

However, when conventional ASA resins are exposed to various solvents or chemicals, discoloration or cracks occur, and physical properties deteriorate. Accordingly, in manufacture of industrial carts using a method of coextruding steel/plastic, the conventional ASA resins are difficult to use.

To overcome these problems, a method of increasing the molecular weight of an ASA resin or a method of increasing the content or average particle diameter of rubber has been used. Solvent resistance or chemical resistance against chemicals such as pesticides and fungicides that are widely used on industrial sites is not satisfactory.

Therefore, it is necessary to develop a thermoplastic ASA resin for steel/plastic coextrusion that allows implementation of various colors without deterioration in mechanical properties and processability and prevents discoloration and cracks due to excellent solvent resistance against various solvents or excellent chemical resistance against chemicals.

RELATED ART DOCUMENTS

Patent Documents

KR 2009-0095764 A

DISCLOSURE

Technical Problem

Therefore, the present invention has been made in view of the above problems, and it is one object of the present invention to provide a thermoplastic resin composition that allows implementation of various colors while having mechanical properties and processability equal or superior to those of conventional ASA-based resins and prevents discoloration and cracks due to excellent solvent resistance and chemical resistance thereof and a molded article including the thermoplastic resin composition. With these properties, the thermoplastic resin composition may be suitable for steel/plastic coextrusion in manufacture of industrial carts.

The above and other objects can be accomplished by the present invention described below.

Technical Solution

In accordance with one aspect of the present invention, provided is a thermoplastic resin composition comprising 100 parts by weight of a base resin comprising 10 to 50% by weight of an acrylate-aromatic vinyl compound-vinyl cyanide compound graft copolymer (A-1) containing acrylate rubber having an average particle diameter of 0.3 to 0.5 μm, 5 to 40% by weight of an acrylate-aromatic vinyl compound-vinyl cyanide compound graft copolymer (A-2) containing acrylate rubber having an average particle diameter of 0.05 μm or more and less than 0.3 μm, and 20 to 65% by weight of an aromatic vinyl polymer (B); and 0.5 to 12 parts by weight of a polyamide (C); wherein the thermoplastic resin composition has a solvent resistance of 15 days or more, wherein the solvent resistance is measured as time when a crack occurs in a solvent consisting of 98% by weight of water, 1% by weight of citric acid, and 1% by weight of malic acid.

In addition, the present invention may provide a thermoplastic resin composition comprising 100 parts by weight of a base resin including 10 to 50% by weight of an acrylate-aromatic vinyl compound-vinyl cyanide compound graft copolymer (A-1) comprising acrylate rubber having an average particle diameter of 0.3 to 0.5 μm, 5 to 40% by weight of an acrylate-aromatic vinyl compound-vinyl cyanide compound graft copolymer (A-2) comprising acrylate rubber having an average particle diameter of 0.05 μm or more and less than 0.3 μm, and 20 to 65% by weight of an aromatic vinyl polymer (B); and 0.5 to 12 parts by weight of a polyamide (C); wherein the thermoplastic resin composition has a chemical resistance of 15 days or more, wherein the chemical resistance is measured as time when a crack occurs in a permethrin-containing emulsion solution in which 0.25 g of permethrin (cis:trans isomer ratio: 25:75) as an insecticidal active ingredient per 100 ml is dissolved.

An emulsion solution prepared by diluting permethrin with water may be used as the permethrin-containing emulsion solution without particular limitation. As a specific example, the permethrin-containing emulsion solution may be an emulsion solution including 0.25% by weight of permethrin, 0.075% by weight of octylphenol polyethylene glycol ether, 0.075% by weight of calcium dodecylbenzenesulfonate, 0.1% by weight of castor oil polyglycol ether, 0.75% by weight of cyclohexanone, 1.25% by weight of a xylene mixture, and 97.5% by weight of dilute water.

In addition, the present invention may provide a thermoplastic resin composition comprising 100 parts by weight of a base resin including 10 to 50% by weight of an acrylate-aromatic vinyl compound-vinyl cyanide compound graft copolymer (A-1) comprising acrylate rubber having an average particle diameter of 0.3 to 0.5 μm, 5 to 40% by weight of an acrylate-aromatic vinyl compound-vinyl cyanide compound graft copolymer (A-2) comprising acrylate rubber having an average particle diameter of 0.05 μm or more and less than 0.3 μm, and 20 to 65% by weight of an aromatic vinyl polymer (B); and 0.5 to 12 parts by weight of a polyamide (C); wherein the thermoplastic resin composition has a gloss of 30 or less as measured at 45° using a VG7000 gloss meter.

In accordance with another aspect of the present invention, provided is a molded article comprising the thermoplastic resin composition.

In accordance with yet another aspect of the present invention, provided is a method of manufacturing an unpainted coated pipe, the method comprising feeding 100 parts by weight of a base resin including 10 to 50% by weight of an acrylate-aromatic vinyl compound-vinyl cyanide compound graft copolymer (A-1) comprising acrylate rubber having an average particle diameter of 0.3 to 0.5 μm, 5 to 40% by weight of an acrylate-aromatic vinyl compound-vinyl cyanide compound graft copolymer (A-2) comprising acrylate rubber having an average particle diameter of 0.05 μm or more and less than 0.3 μm, and 20 to 65% by weight of an aromatic vinyl polymer (B); and 0.5 to 12 parts by weight of a polyamide (C); into an extruder to prepare pellets, and coextruding the prepared pellets and a steel pipe to manufacture an unpainted coated pipe, wherein the unpainted coated pipe has a solvent resistance of 15 days or more, wherein the solvent resistance is measured as time when a crack occurs in a solvent consisting of 98% by weight of water, 1% by weight of citric acid, and 1% by weight of malic acid.

In addition, the present invention may provide a method of manufacturing an unpainted coated pipe, the method comprising feeding 100 parts by weight of a base resin comprising 10 to 50% by weight of an acrylate-aromatic vinyl compound-vinyl cyanide compound graft copolymer (A-1) comprising acrylate rubber having an average particle diameter of 0.3 to 0.5 μm, 5 to 40% by weight of an acrylate-aromatic vinyl compound-vinyl cyanide compound graft copolymer (A-2) comprising acrylate rubber having an average particle diameter of 0.05 μm or more and less than 0.3 μm, and 20 to 65% by weight of an aromatic vinyl polymer (B); and 0.5 to 12 parts by weight of a polyamide (C); into an extruder to prepare pellets, and coextruding the prepared pellets and a steel pipe to manufacture an unpainted coated pipe, wherein the unpainted coated pipe has a chemical resistance of 15 days or more, wherein the chemical resistance is measured as time when a crack occurs in a permethrin-containing emulsion solution in which 0.25 g of permethrin (cis:trans isomer ratio: 25:75) as an insecticidal active ingredient per 100 ml is dissolved.

In addition, the present invention may provide a method of manufacturing an unpainted coated pipe, the method comprising: feeding 100 parts by weight of a base resin comprising 10 to 50% by weight of an acrylate-aromatic vinyl compound-vinyl cyanide compound graft copolymer (A-1) comprising acrylate rubber having an average particle diameter of 0.3 to 0.5 μm, 5 to 40% by weight of an acrylate-aromatic vinyl compound-vinyl cyanide compound graft copolymer (A-2) containing acrylate rubber having an average particle diameter of 0.05 μm or more and less than 0.3 μm, and 20 to 65% by weight of an aromatic vinyl polymer (B); and 0.5 to 12 parts by weight of a polyamide (C); into an extruder to prepare pellets, and coextruding the prepared pellets and a steel pipe to manufacture an unpainted coated pipe, wherein the unpainted coated pipe has a gloss of 30 or less as measured at 45° using a VG7000 gloss meter.

Advantageous Effects

As apparent from the foregoing, the present invention advantageously provides a thermoplastic resin composition that allows implementation of various colors without deterioration in mechanical properties and processability and prevents discoloration and cracks due to excellent solvent resistance and chemical resistance thereof and a molded article including the thermoplastic resin composition.

In addition, the present invention can provide a thermoplastic resin composition suitable for steel/plastic coextrusion, in particular, steel/plastic coextrusion in manufacture of industrial carts, and a molded article including the thermoplastic resin composition.

BEST MODE

Hereinafter, a thermoplastic resin composition and a molded article including the same according to the present invention will be described in detail.

The present inventors conducted studies to develop an ASA resin having mechanical properties and chemical resistance and suitable for steel/plastic coextrusion in manufacture of industrial carts. As a result of such studies, it was confirmed that, when two types of ASA resins each containing rubber particles having different particle diameters were mixed with a predetermined aromatic vinyl polymer and a predetermined polyamide in a specific composition ratio, and a solvent resistance value or a chemical resistance value measured according to specific methods were adjusted within predetermined ranges, implementation of various colors was possible while maintaining mechanical properties and processability equal or superior to those of conventional ASA-based resins, and no discoloration and crack occurred. In addition, the present inventors confirmed that, based on such features, the ASA resin of the present invention was suitable for the manufacture of an industrial cart. Based on these results, the present inventors conducted further studies to complete the present invention.

The thermoplastic resin composition of the present invention includes 100 parts by weight of a base resin including 10 to 50% by weight of an acrylate-aromatic vinyl compound-vinyl cyanide compound graft copolymer (A-1) (hereinafter referred to as "general-diameter ASA resin") containing acrylate rubber having an average particle diameter of 0.3 to 0.5 μm, 5 to 40% by weight of an acrylate-aromatic vinyl compound-vinyl cyanide compound graft copolymer (A-2) (hereinafter referred to as "small-diameter ASA resin") containing acrylate rubber having an average particle diameter of 0.05 μm or more and less than 0.3 μm, and 20 to 65% by weight of an aromatic vinyl polymer (B); and 0.5 to 12 parts by weight of a polyamide (C), wherein the thermoplastic resin composition has a solvent resistance of 15 days or more. In this case, the solvent resistance is measured as time when cracks occur in a solvent consisting of 98% by weight of water, 1% by weight of citric acid, and 1% by weight of malic acid. In this case, the thermoplastic resin composition may implement various colors without deterioration in mechanical properties and processability and may prevent discoloration and cracks. Thus, the thermoplastic resin composition may be suitably used in manufacture of industrial carts.

In addition, the thermoplastic resin composition of the present invention includes 100 parts by weight of a base resin including 10 to 50% by weight of the general-diameter ASA resin (A-1), 5 to 40% by weight of the small-diameter ASA resin (A-2), and 20 to 65% by weight of the aromatic vinyl polymer (B); and 0.5 to 12 parts by weight of the polyamide (C), wherein the thermoplastic resin composition has a chemical resistance of 15 days or more. In this case, the chemical resistance is measured as time when a crack occurs in a permethrin-containing emulsion solution in which 0.25 g of permethrin (cis:trans isomer ratio: 25:75) as an insecticidal active ingredient per 100 ml is dissolved. In this case, various colors may be implemented without deterioration in mechanical properties and processability, and no discoloration and crack occur, thereby providing a thermoplastic resin composition suitable for industrial carts.

In addition, the thermoplastic resin composition of the present invention includes 100 parts by weight of a base resin including 10 to 50% by weight of the general-diameter ASA resin (A-1), 5 to 40% by weight of the small-diameter ASA resin (A-2), and 20 to 65% by weight of the aromatic vinyl polymer (B); and 0.5 to 12 parts by weight of the polyamide (C), and has an injection gloss of 30 or less as measured at 45° using a VG7000 gloss meter. In this case, various colors may be implemented without deterioration in mechanical properties and processability, and no discoloration and crack occur, thereby providing a thermoplastic resin composition suitable for industrial carts.

In this description, solvent resistance means resistance to solvents, and chemical resistance means resistance to both solvents and chemicals. Accordingly, in this description, when both a solvent and a chemical are included, chemical resistance is used.

Hereinafter, each component constituting the thermoplastic resin composition of the present invention will be described in detail as follows.

A-1) General-Diameter ASA Resin

For example, the average particle diameter of the acrylate rubber contained in the general-diameter ASA resin (A-1) of the present invention may be 0.3 to 0.5 μm, preferably 0.35 to 0.5 μm, more preferably 0.35 to 0.45 μm, still more preferably 0.40 to 0.45 μm. Within this range, weather resistance may be good, and fluidity and mechanical strength, such as tensile strength and impact strength, may be excellent.

In this description, the average particle diameter may be measured by dynamic light scattering, and specifically, may be measured as an intensity value using a Nicomp 380 particle size analyzer (manufacturer: PSS) in a Gaussian mode.

In addition, in this description, the average particle diameter may be an arithmetic average particle diameter in a particle size distribution measured by dynamic light scattering, specifically, a scattering intensity average particle diameter. As a specific measurement example, a sample may be prepared by diluting 0.1 g of latex (TSC: 35 to 50 wt %) 1,000 to 5,000 times with distilled water, and average particle diameter may be measured using flow cells in an auto-dilution manner and in a mode of dynamic light scattering/intensity 300 kHz/intensity-weight Gaussian analysis.

In this case, temperature, measurement wavelength, and channel width may be set to 23° C., 632.8 nm, and 10 psec, respectively.

Based on 100% by weight in total of the base resin, the general-diameter ASA resin (A-1) is preferably included in an amount of 10 to 50% by weight, more preferably 15 to 40% by weight, still more preferably 20 to 40% by weight, most preferably 20 to 35% by weight. Within this range, weather resistance, fluidity, tensile strength, and impact strength may be excellent.

For example, the general-diameter ASA resin (A-1) may include 40 to 60% by weight of acrylate rubber, 20 to 40% by weight of an aromatic vinyl compound, and 10 to 20% by weight of a vinyl cyanide compound, as a preferred example, 45 to 55% by weight of acrylate rubber, 30 to 40% by weight of an aromatic vinyl compound, and 10 to 20% by weight of a vinyl cyanide compound, as a still more preferred example, 50 to 55% by weight of acrylate rubber, 30 to 35% by weight of an aromatic vinyl compound, and 10 to 20% by weight of a vinyl cyanide compound. Within this range, weather resistance, fluidity, tensile strength, and impact strength may be excellent.

In this description, a polymer including a compound refers to a polymer prepared by polymerizing the compound, and a unit in the polymerized polymer is derived from the compound.

For example, the acrylate may include one or more selected from the group consisting of alkyl acrylates containing an alkyl group having 2 to 8 carbon atoms, and is preferably an alkyl acrylate containing an alkyl group having 4 to 8 carbon atoms, more preferably butyl acrylate or ethylhexyl acrylate.

For example, the aromatic vinyl compound may include one or more selected from the group consisting of styrene, α-methylstyrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

For example, the general-diameter ASA resin (A-1) may be prepared by emulsion polymerization. In this case, weather resistance, fluidity, tensile strength, and impact strength may be excellent.

Emulsion polymerization commonly practiced in the art to which the present invention pertains may be used in the present invention without particular limitation.

A-2) Small-Diameter ASA Resin

For example, the average particle diameter of the acrylate rubber contained in the small-diameter ASA resin (A-2) of the present invention may be 0.1 to 0.2 μm, preferably 0.1 to 0.18 μm, more preferably 0.11 to 0.15 μm, still more preferably 0.11 to 0.13 μm. Within this range, a thermoplastic resin composition having excellent weather resistance, colorability, impact strength, chemical resistance, and gloss may be prepared.

Based on 100% by weight in total of the base resin, the small-diameter ASA resin (A-2) is preferably included in an amount of 5 to 40% by weight, more preferably 5 to 30% by weight, still more preferably 10 to 30% by weight, most preferably 10 to 25% by weight. Within this range, weather resistance, fluidity, tensile strength, and impact strength may be excellent.

Based on 100% by weight in total of the base resin, the total weight of the general-diameter ASA resin (A-1) and the small-diameter ASA resin (A-2) is preferably 30 to 60% by weight, more preferably 35 to 55% by weight, still more preferably 35 to 50% by weight. Within this range, gloss, solvent resistance, and chemical resistance may be excellent.

Preferably, the weight content of the general-diameter ASA resin (A-1) is greater than that of the small-diameter ASA resin (A-2). As a more preferred example, the weight ratio of the general-diameter ASA resin (A-1) to the small-diameter ASA resin (A-2) (A-1:A-2) is 1:0.1 to 1:0.9, still more preferably 1:0.3 to 1:0.8, most preferably 1:0.4 to 1:0.8. Within this range, gloss, solvent resistance, and chemical resistance may be excellent.

For example, the small-diameter ASA resin (A-2) may include 40 to 60% by weight of acrylate rubber, 20 to 40% by weight of an aromatic vinyl compound, and 10 to 20% by weight of a vinyl cyanide compound, as a preferred example, 45 to 55% by weight of acrylate rubber, 30 to 40% by weight of an aromatic vinyl compound, and 10 to 20% by weight of a vinyl cyanide compound, as a still more preferred example, 50 to 55% by weight of acrylate rubber, 30 to 35% by weight of an aromatic vinyl compound, and 10 to 20% by weight of a vinyl cyanide compound. Within this range, weather resistance, fluidity, tensile strength, and impact strength may be excellent.

For example, the small-diameter ASA resin (A-2) may be prepared by emulsion polymerization. In this case, chemical resistance, weather resistance, fluidity, tensile strength, and impact strength may be excellent.

Emulsion polymerization commonly practiced in the art to which the present invention pertains may be used in the present invention without particular limitation.

B) Aromatic Vinyl Polymer

Based on the total weight of the base resin, the aromatic vinyl polymer (B) of the present invention is preferably included in an amount of 20 to 65% by weight, more preferably 30 to 65% by weight, still more preferably 30 to 60% by weight, still more preferably 40 to 60% by weight, most preferably 45 to 55% by weight. Within this range, weather resistance and gloss may be excellent.

The aromatic vinyl polymer (B) preferably includes one or more selected from the group consisting of an aromatic vinyl compound-vinyl cyanide compound copolymer (i), a heat-resistant styrene-based resin (ii), and a methacrylate-aromatic vinyl compound-vinyl cyanide compound copolymer (iii), and is more preferably an aromatic vinyl compound-vinyl cyanide compound copolymer, a methacrylate-aromatic vinyl compound-vinyl cyanide compound copolymer, or a mixture thereof, still more preferably an aromatic vinyl compound-vinyl cyanide compound copolymer. Within this range, weather resistance, matte properties, solvent resistance, and chemical resistance may be excellent.

i) Aromatic Vinyl Compound-Vinyl Cyanide Compound Copolymer

Based on the total weight of the base resin, the aromatic vinyl compound-vinyl cyanide compound copolymer (i) is preferably included in an amount of 20 to 60% by weight, more preferably 30 to 60% by weight, still more preferably 40 to 50% by weight, most preferably 45 to 50% by weight. Within this range, solvent resistance and chemical resistance may be excellent.

The aromatic vinyl compound-vinyl cyanide compound copolymer (i) is preferably an aromatic vinyl compound-vinyl cyanide compound copolymer including 65 to 80% by weight of an aromatic vinyl compound and 20 to 35% by weight of a vinyl cyanide compound, more preferably an aromatic vinyl compound-vinyl cyanide compound copolymer including 65 to 75% by weight of an aromatic vinyl compound and 25 to 35% by weight of a vinyl cyanide compound, still more preferably an aromatic vinyl compound-vinyl cyanide compound copolymer including 70 to 75% by weight of an aromatic vinyl compound and 25 to 30% by weight of a vinyl cyanide compound, most preferably, an aromatic vinyl compound-vinyl cyanide compound copolymer including 72 to 75% by weight of an aromatic vinyl compound and 25 to 28% by weight of a vinyl cyanide compound. Within this range, solvent resistance and chemical resistance may be excellent.

The aromatic vinyl compound-vinyl cyanide compound copolymer (i) preferably has a weight average molecular weight of 100,000 to 200,000 g/mol, more preferably 110,000 to 180,000 g/mol, as a preferred example, a weight average molecular weight of 120,000 to 170,000 g/mol. Within this range, solvent resistance and chemical resistance may be excellent.

As another preferred example, the aromatic vinyl compound-vinyl cyanide compound copolymer (i) has a weight average molecular weight of 100,000 to 150,000 g/mol, as a more preferred example, 110,000 to 140,000 g/mol, as a still more preferred example, 120,000 to 130,000 g/mol. Within this range, matte properties, solvent resistance, and chemical resistance may be excellent.

As another example, based on the total weight of the base resin, the aromatic vinyl compound-vinyl cyanide compound copolymer (i) may include 10 to 60% by weight of an aromatic vinyl compound-vinyl cyanide compound copolymer (a) having a weight average molecular weight of 100,000 to 150,000 g/mol and 0 to 40% by weight of an aromatic vinyl compound-vinyl cyanide compound copolymer (b) having a weight average molecular weight of greater than 150,000 g/mol and 200,000 g/mol or less. Within this range, tensile strength and impact strength may be excellent.

As another preferred example, based on the total weight of the base resin, the aromatic vinyl compound-vinyl cyanide compound copolymer (i) may include 20 to 50% by weight of the aromatic vinyl compound-vinyl cyanide compound copolymer (a) having a weight average molecular weight of 100,000 to 150,000 g/mol and 20 to 40% by weight of the aromatic vinyl compound-vinyl cyanide compound copolymer (b) having a weight average molecular weight of greater than 150,000 g/mol and 200,000 g/mol or less. Within this range, tensile strength and impact strength may be excellent.

As a more preferred example, based on the total weight of the base resin, the aromatic vinyl compound-vinyl cyanide compound copolymer (i) may include 20 to 50% by weight of the aromatic vinyl compound-vinyl cyanide compound copolymer (a) having a weight average molecular weight of 100,000 to 150,000 g/mol and 30 to 40% by weight of the aromatic vinyl compound-vinyl cyanide compound copolymer (b) having a weight average molecular weight of greater than 150,000 g/mol and 200,000 g/mol or less. Within this range, tensile strength and impact strength may be excellent.

As a more specific example, based on the total weight of the base resin, the aromatic vinyl compound-vinyl cyanide compound copolymer (i) may include 10 to 30% by weight, preferably 15 to 25% by weight of the aromatic vinyl compound-vinyl cyanide compound copolymer (a) and 25 to 45% by weight, more preferably 30 to 40% by weight of the aromatic vinyl compound-vinyl cyanide compound copolymer (b). Within this range, tensile strength and impact strength may be excellent.

For example, the aromatic vinyl compound may include one or more selected from the group consisting of styrene, α-methylstyrene, m-methylstyrene, p-methylstyrene, and p-tert-butylstyrene, preferably styrene. In this case, mechanical strength may be excellent.

For example, the vinyl cyanide compound may include one or more selected from the group consisting of acrylonitrile, methacrylonitrile, ethylacrylonitrile, and isopropylacrylonitrile, preferably acrylonitrile. In this case, mechanical strength may be excellent.

For example, the aromatic vinyl compound-vinyl cyanide compound copolymer may be prepared by suspension polymerization, emulsion polymerization, solution polymerization, or bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limitation.

ii) Heat-Resistant Styrene-Based Resin

Based on the total weight of the base resin, the heat-resistant styrene-based resin (ii) is preferably included in an amount of 30% by weight or less, more preferably 20% by weight or less, still more preferably 10% by weight or less. As a preferred example, the heat-resistant styrene-based resin (ii) is absent. In this case, solvent resistance and chemical resistance may be excellent.

As another example, the heat-resistant styrene-based resin (ii) may be included in an amount of 1 to 20% by weight, preferably 5 to 17% by weight, more preferably 5 to 15% by weight. Within this range, mechanical properties and heat resistance may be excellent.

The heat-resistant styrene-based resin (ii) preferably includes 60 to 80% by weight of α-methylstyrene, 20 to 40% by weight of a vinyl cyanide compound, and 0 to 10% by weight of an aromatic vinyl compound (however, α-methylstyrene is excluded), more preferably 60 to 75% by weight of α-methylstyrene, 20 to 30% by weight of a vinyl cyanide compound, and 0 to 10% by weight of an aromatic vinyl compound. Within this range, mechanical properties and heat resistance may be excellent.

The heat-resistant styrene-based resin (ii) is preferably an α-methylstyrene-vinyl cyanide compound copolymer. In this case, mechanical properties and heat resistance may be excellent.

The heat-resistant styrene-based resin (ii) preferably has a weight average molecular weight of 80,000 to 150,000 g/mol, more preferably 80,000 to 120,000 g/mol, still more preferably 80,000 to 100,000 g/mol. Within this range, heat resistance may be excellent.

In this description, unless defined otherwise, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1× PLgel 10 μm MiniMix-B (250×4.6 mm)+ 1× PLgel 10 μm MiniMix-B (250×4.6 mm)+1× PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, the aromatic vinyl compound may include one or more selected from the group consisting of styrene, α-methylstyrene, m-methylstyrene, p-methylstyrene, and p-tert-butylstyrene, preferably styrene. In this case, mechanical strength may be excellent.

For example, the vinyl cyanide compound may include one or more selected from the group consisting of acrylonitrile, methacrylonitrile, ethylacrylonitrile, and isopropylacrylonitrile, preferably acrylonitrile. In this case, mechanical strength may be excellent.

For example, the heat-resistant styrene-based resin (ii) may be prepared by suspension polymerization, emulsion polymerization, solution polymerization, or bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limitation.

iii) Methacrylate-Aromatic Vinyl Compound-Vinyl Cyanide Compound Copolymer

Based on the total weight of the base resin, the methacrylate-aromatic vinyl compound-vinyl cyanide compound copolymer (iii) is preferably included in an amount of 40% by weight or less, more preferably 30% by weight or less, as a specific example, 1 to 40% by weight, as a preferred example, 10 to 40% by weight, as a more preferred example, 10 to 30% by weight, as a still more preferred example, 20 to 30% by weight. Within this range, weather resistance may be greatly improved, and mechanical properties such as tensile strength and hardness may be excellent.

The methacrylate-aromatic vinyl compound-vinyl cyanide compound copolymer (iii) preferably includes 60 to 85% by weight of a methacrylate compound, 5 to 30% by weight of an aromatic vinyl compound, and 5 to 30% by weight of a vinyl cyanide compound, more preferably 60 to % by weight of a methacrylate compound, 5 to 20% by weight of an aromatic vinyl compound, and 15 to 30% by weight of a vinyl cyanide compound, still more preferably 70 to 80% by weight of a methacrylate compound, 5 to 15% by weight of an aromatic vinyl compound, and 15 to 25% by weight of a vinyl cyanide compound. Within this range, weather resistance may be greatly improved, and mechanical properties such as tensile strength and hardness may be excellent.

Based on the total weight of the methacrylate-aromatic vinyl compound-vinyl cyanide compound copolymer (iii), the methacrylate compound is preferably included in an amount of 60 to 80% by weight, more preferably 65 to 80% by weight. Within this range, weather resistance may be greatly improved, and mechanical properties such as tensile strength and hardness may be excellent.

For example, the methacrylate compound may be an alkyl methacrylate containing an alkyl group having 1 to 15 carbon atoms. As a specific example, the methacrylate compound may include one or more selected from the group consisting of methyl methacrylate, ethyl methacrylate, butyl methacrylate, 2-ethylbutyl methacrylate, 2-ethylhexyl methacrylate, and lauryl methacrylate, and is preferably an alkyl methacrylate containing a chain alkyl group having 1 to 4 carbon atoms, more preferably methyl methacrylate.

For example, the aromatic vinyl compound may include one or more selected from the group consisting of styrene, α-methylstyrene, m-methylstyrene, p-methylstyrene, and p-tert-butylstyrene, preferably styrene. In this case, mechanical strength may be excellent.

For example, the vinyl cyanide compound may include one or more selected from the group consisting of acrylonitrile, methacrylonitrile, ethylacrylonitrile, and isopropylacrylonitrile, preferably acrylonitrile. In this case, mechanical strength may be excellent.

The methacrylate-aromatic vinyl compound-vinyl cyanide compound copolymer (iii) preferably has a weight average molecular weight of 80,000 to 200,000 g/mol, more preferably 100,000 to 150,000 g/mol, still more preferably 120,000 to 140,000 g/mol. Within this range, weather resistance may be greatly improved, and mechanical properties such as tensile strength and hardness may be excellent.

As another example, the methacrylate-aromatic vinyl compound-vinyl cyanide compound copolymer (iii) may be a mixture of a methyl methacrylate-styrene-acrylonitrile copolymer (hereinafter referred to as "low-molecular weight SAMMA resin") having a weight average molecular weight of 80,000 to 110,000 g/mol and a methyl methacrylate-styrene-acrylonitrile copolymer (hereinafter referred to as "high-molecular weight SAMMA resin") having a weight average molecular weight of 120,000 to 200,000 g/mol.

For example, the weight ratio of the low-molecular weight SAMMA resin to the high-molecular weight SAMMA resin may be 1:0.1 to 0.45, preferably 1:0.2 to 0.45, more preferably 1:0.3 to 0.45, still more preferably 1:0.35 to 0.45. Within this range, weather resistance may be excellent.

For example, the methacrylate-aromatic vinyl compound-vinyl cyanide compound copolymer (iii) may be prepared by solution polymerization, bulk polymerization, emulsion polymerization, or suspension polymerization. Solution polymerization, bulk polymerization, emulsion polymerization, and suspension polymerization commonly practiced in the art to which the present invention pertains may be used in the present invention without particular limitation.

C) Polyamide

The polyamide (C) of the present invention may greatly contribute to solvent resistance and chemical resistance, and is preferably included in an amount of 0.5 to 12 parts by weight, more preferably 1 to 10 parts by weight, still more preferably 3 to 10 parts by weight, still even more preferably 4 to 10 parts by weight, most preferably 6 to 10 parts by weight based on the 100 parts by weight of the base resin. Within this range, solvent resistance, chemical resistance, and physical property balance may excellent.

The polyamide (C) means a thermoplastic polymer including amide bonds, and as a specific example, may include one or more selected from the group consisting of polyamide 6, polyamide 66 (PA 6.6), polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 91, polyamide 6/9T, polyamide 6/91, polyamide 66/9T, polyamide 6/12/9T, polyamide 66/12/9T, polyamide 6/12/91, and polyamide 66/12/6I, preferably one or more selected from the group consisting of polyamide 6 (PA 6) and polyamide 66(PA 6.6). Within this range, solvent resistance, chemical resistance, and physical property balance may be excellent.

More preferably, the polyamide (C) includes nylon6 and nylon66. In this case, in addition to solvent resistance and chemical resistance, gloss properties may be excellent.

The weight ratio of nylon6 to nylon66 (nylon6:nylon66) is preferably 1:1.1 to 10, more preferably 1:1.5 to 5, still more preferably 1:2 to 5, most preferably 1:2 to 4. In this case, in addition to solvent resistance and chemical resistance, low gloss properties may be excellent.

For example, to improve chemical resistance and physical property balance, one or more polyamides each having a low melting point, as an example, a melting point of 260° C. or lower, preferably 240° C. or lower, more preferably 230° C. or lower, still more preferably 210 to 220° C. may be used as the polyamide (C). To improve low gloss properties, one or more polyamides each having a high melting point, as an example, a melting point of 230° C. or higher, preferably 240° C. or higher, more preferably 260° C. or higher may be used as the polyamide (C). Preferably, the polyamide having a low melting point and the polyamide having a high melting point are mixed and used.

In this description, a melting point may be measured using a differential scanning calorimeter 2920 (DSC) (TA Co.). As a specific example of melting point measurement, the temperature of a DSC is adjusted to 0° C., the temperature is increased to 180° C. at a rate of 20° C. per minute, the temperature is decreased to −60° C. at a rate of −20° C. per minute, and then the temperature is increased to 180° C. at a rate of 10° C. per minute. In this cycle, a melting point may be measured in the top region of an endothermic curve in the second temperature rise section.

For example, the polyamide (C) having a relative viscosity (96% sulfuric acid solution) of 2.0 to 4.0, preferably 2.0 to 3.5, more preferably 2.0 to 3.0, still more preferably 2.4 to 2.7 may be used.

In this description, unless defined otherwise, % means % by weight.

In this description, relative viscosity may be measured using an Ubbelohde viscometer by a sulfuric acid method according to ISO 307.

Polymerization methods commonly practiced in the art to which the present invention pertains may be used to prepare the polyamide (C) without particular limitation, and commercially available polyamides may be used when the commercially available polyamides conform to the definition of the polyamide according to the invention.

Thermoplastic Resin Composition

The thermoplastic resin composition of the present invention preferably has a solvent resistance of 15 days or more. In this case, the solvent resistance is measured as time when a crack occurs in a solvent consisting of 98% by weight of water, 1% by weight of citric acid, and 1% by weight of malic acid. In this case, various colors may be implemented while maintaining mechanical properties and processability equal or superior to those of conventional ASA-based resins, and no discoloration and cracks occurs, thereby providing a thermoplastic resin composition suitable for industrial carts.

The thermoplastic resin composition preferably has a chemical resistance of 15 days or more. In this case, the chemical resistance is measured as time when a crack occurs in a permethrin-containing emulsion solution in which 0.25 g of permethrin (cis:trans isomer ratio: 25:75) as an insecticidal active ingredient per 100 ml is dissolved. In this case, various colors may be implemented while maintaining mechanical properties and processability equal or superior to those of conventional ASA-based resins, and no discoloration and cracks occurs, thereby providing a thermoplastic resin composition suitable for industrial carts.

The thermoplastic resin composition preferably has an injection gloss of 30 or less as measured at 45° using a VG7000 gloss meter. In this case, various colors may be implemented while maintaining mechanical properties and processability equal or superior to those of conventional ASA-based resins, and no discoloration and cracks occurs, thereby providing a thermoplastic resin composition suitable for industrial carts.

More preferably, the thermoplastic resin composition has an injection gloss of 29 or less, as a preferred example, 15 to 30, as a more preferred example, 16 to 29, as measured at 45° using a VG7000 gloss meter. Within this range, matte properties, solvent resistance, and chemical resistance may be excellent.

As another example, the thermoplastic resin composition preferably has a film gloss of 10 or less, preferably 8 or less, more preferably 7 or less, as a preferred example, 1 to 10, as a more preferred example, 2 to 8, as a still more preferred example, 3 to 7, as measured using a sheet having a thickness of 0.15 T and at 60° using a VG7000 gloss meter. Within this range, matte properties, solvent resistance, and chemical resistance may be excellent.

The thermoplastic resin composition preferably has an Izod impact strength of 4 kg-cm/cm or more, preferably 6 kg-cm/cm or more, as a specific example, 6 to 13 kg-cm/cm, as measured according to ASTM 256.

The thermoplastic resin composition preferably has a hardness (R-Scale) of 80 or more, preferably 85 or more, as a specific example, 80 to 105, as a preferred example, 86 to 104, as measured according to ASTM D785. Within this range, hardness and physical property balance may be excellent.

The thermoplastic resin composition preferably has a tensile strength (⅛ inch) of 350 kg/cm² or more, more preferably 380 kg/cm² or more, still more preferably 400 kg/cm² or more, as a specific example, 350 to 480 kg/cm², as a preferred example, 380 to 480 kg/cm², as a more preferred example, 400 to 450 kg/cm², as measured according to ASTM 638. Within this range, mechanical properties, solvent resistance, and chemical resistance may be excellent.

For example, the thermoplastic resin composition preferably has a weather resistance (ΔE) of 6 or less, preferably 4 or less, more preferably 3 or less, still more preferably 2 or less as measured for 2,000 hours according to SAE J1960. Within this range, weather resistance and physical property balance may be excellent.

The thermoplastic resin composition may have a melt index (MI) (220° C., load: 10 kg) of 3 g/10 min or more, preferably 4 g/10 min or more, more preferably 4 to 12 g/10 min, still more preferably 5 to 8 g/10 min as measured according to ASTM D1238. Within this range, coextrusion-related physical properties may be excellent.

When necessary, the thermoplastic resin composition may further include 0.01 to 5 parts by weight, 0.05 to 3 parts by weight, 0.1 to 2 parts by weight, or 0.5 to 1 part by weight of one or more selected from the group consisting of a heat stabilizer, a light stabilizer, a dye, a pigment, a colorant, a release agent, an antistatic agent, an antibacterial agent, a processing aid, a metal deactivator, a flame retardant, a smoke suppressant, an anti-dripping agent, an anti-friction agent, and an anti-wear agent. Within this range, required physical properties may be implemented without deterioration in the intrinsic physical properties of the thermoplastic resin composition of the present invention.

The method of preparing the thermoplastic resin composition of the present invention preferably includes a step of mixing 100 parts by weight of a base resin including 10 to 50% by weight of the general-diameter ASA resin (A-1), 5 to 40% by weight of the small-diameter ASA resin (A-2), and 20 to 65% by weight of the aromatic vinyl polymer (B) and 0.5 to 12 parts by weight of the polyamide (C) and; a step of preparing pellets at 220 to 280° C. using an extrusion kneader. In this case, the thermoplastic resin composition may implement various colors without deterioration in mechanical properties and processability, and may prevent discoloration and cracks due to excellent chemical resistance thereof. Thus, the thermoplastic resin composition may be suitable for steel/plastic coextrusion in manufacture of industrial carts.

The method of preparing the thermoplastic resin composition shares all the technical characteristics of the above-described thermoplastic resin composition. Accordingly, repeated description thereof will be omitted.

The step of preparing pellets using an extrusion kneader is preferably performed at 220 to 280° C., more preferably 220 to 250° C. In this case, the temperature is the temperature of a cylinder.

Extrusion kneaders commonly used in the art to which the present invention pertains may be used without particular limitation, and a twin-screw extrusion kneader is preferably used.

Molded Article

The molded article of the present invention includes the thermoplastic resin composition of the present invention. In this case, mechanical properties and processability may be excellent, various colors may be implemented, and occurrence of discoloration and cracks may be prevented due to excellent solvent resistance and chemical resistance.

The molded article is preferably an unpainted coated pipe obtained by coextruding the thermoplastic resin composition and a steel pipe. In this case, mechanical properties and processability may be excellent, various colors may be implemented, and occurrence of discoloration and cracks may be prevented due to excellent solvent resistance and chemical resistance.

The method of manufacturing an unpainted coated pipe preferably includes a step of mixing 100 parts by weight of a base resin including 10 to 50% by weight of the general-diameter ASA resin (A-1), 5 to 40% by weight of the small-diameter ASA resin (A-2), and 20 to 65% by weight of the aromatic vinyl polymer (B) and 0.5 to 12 parts by weight of the polyamide (C) and preparing pellets at 220 to 280° C. using an extrusion kneader; and a step of coextruding the prepared pellets and a steel pipe to manufacture an unpainted coated pipe, wherein the unpainted coated pipe has a solvent resistance of 15 days or more. In this case, the solvent resistance is measured as time when a crack occurs in a solvent consisting of 98% by weight of water, 1% by weight of citric acid, and 1% by weight of malic acid. In this case, mechanical properties and processability may be excellent, various colors may be implemented, and occurrence of discoloration and cracks may be prevented due to excellent solvent resistance and chemical resistance.

As another example, the method of manufacturing an unpainted coated pipe includes a step of mixing 100 parts by weight of a base resin including 10 to 50% by weight of the general-diameter ASA resin (A-1), 5 to 40% by weight of the small-diameter ASA resin (A-2), and 20 to 65% by weight of the aromatic vinyl polymer (B) and 0.5 to 12 parts by weight of the polyamide (C) and preparing pellets at 220 to 280° C. using an extrusion kneader; and a step of coextruding the prepared pellets and a steel pipe to manufacture an unpainted coated pipe, wherein the unpainted coated pipe has a chemical resistance of 15 days or more. In this case, the chemical resistance is measured as time when a crack occurs in a permethrin-containing emulsion solution in which 0.25 g of permethrin (cis:trans isomer ratio: 25:75) as an insecticidal active ingredient per 100 ml is dissolved. In this case, mechanical properties and processability may be excellent, various colors may be implemented, and occurrence of discoloration and cracks may be prevented due to excellent solvent resistance and chemical resistance.

As another example, the method of manufacturing an unpainted coated pipe includes a step of mixing 100 parts by weight of a base resin including 10 to 50% by weight of the general-diameter ASA resin (A-1), 5 to 40% by weight of the small-diameter ASA resin (A-2), and 20 to 65% by weight of the aromatic vinyl polymer (B) and 0.5 to 12 parts by weight of the polyamide (C) and preparing pellets at 220 to 280° C. using an extrusion kneader; and a step of coextruding the prepared pellets and a steel pipe to manufacture an unpainted coated pipe, wherein the unpainted coated pipe has a gloss of 30 or less as measured at 45° using a VG7000 gloss meter. In this case, mechanical properties and processability may be excellent, various colors may be implemented, and occurrence of discoloration and cracks may be prevented due to excellent solvent resistance and chemical resistance.

The method of manufacturing an unpainted coated pipe shares all the technical characteristics of the above-described thermoplastic resin composition. Accordingly, repeated description thereof will be omitted.

The molded article of the present invention is preferably manufactured by a method including a step of extruding or injecting the thermoplastic resin composition of the present invention at a molding temperature of 190 to 250° C. Within this range, a matte effect may excellent.

In the description of the thermoplastic resin composition of the present invention, the method of preparing the same, and the molded article including the same, other conditions or equipment that are not explicitly described may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 7 and Comparative Examples 1 to 7 below are as follows.
- A-1) General-diameter ASA resin (rubber: 50% by weight of a butylacrylate polymer-derived unit having an average particle diameter of 400 nm, 35% by weight of a styrene-derived unit, and 15% by weight of an acrylonitrile-derived unit)
- A-2) Small-diameter ASA resin (rubber: 50% by weight of a butylacrylate polymer-derived unit having an average particle diameter of 120 nm, 35% by weight of a styrene-derived unit, and 15% by weight of an acrylonitrile-derived unit)
- B-1) SAN resin prepared by bulk polymerization (styrene-derived unit: 70% by weight, acrylonitrile-derived unit: 30% by weight, weight average molecular weight: 170,000 g/mol)
- B-2) SAN resin prepared by bulk polymerization (styrene-derived unit: 73% by weight, acrylonitrile-derived unit: 27% by weight, weight average molecular weight: 120,000 g/mol)
- B-3) Heat-resistant SAN resin (α-methylstyrene-derived unit: 73% by weight, acrylonitrile-derived unit: 27% by weight, weight average molecular weight: 100,000 g/mol)
- B-4) SAMMA resin (methyl methacrylate-derived unit: % by weight, styrene-derived unit: 22% by weight, acrylonitrile-derived unit: 8% by weight, weight average molecular weight: 80,000 g/mol)
- B-5) MABS resin (MA210 grade, particle diameter: 10 μm, LG Chemical Co.)
- C-1) PA 6.6 (relative viscosity: 2.7)
- C-2) PA 6 (relative viscosity: 2.3)

Examples 1 to 7 and Comparative Examples 1 to 7

Figure 3:
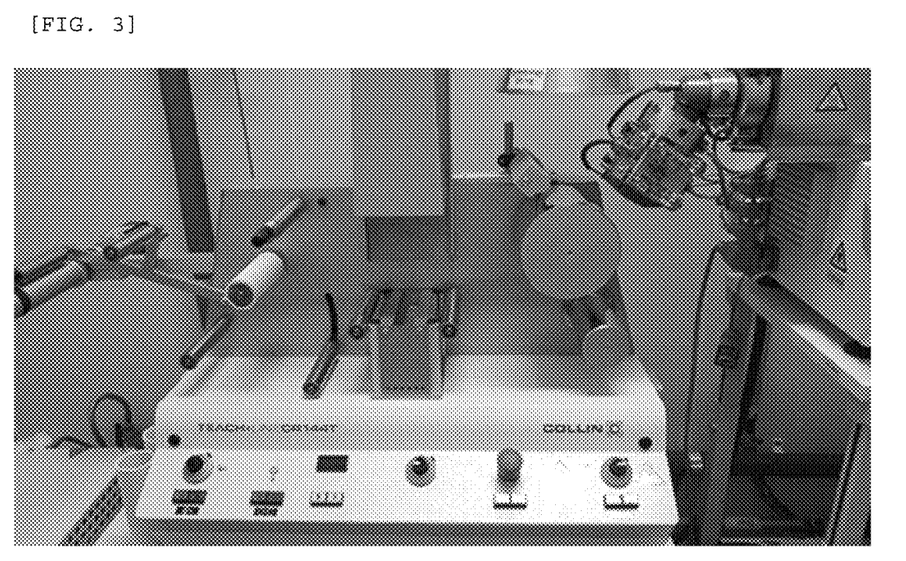
FIG. 3 shows a film extruder used in Examples and Comparative Examples.

According to the components and contents shown in Table 1 below, pellets were prepared at 230° C. using a 36 pi extrusion kneader (a twin-screw extruder), a film with a uniform thickness of 0.15 T was prepared from the pellets using a film extruder, and the physical properties of the prepared film, such as film gloss, were measured according to the following measurement methods. In this case, a single-screw extruder for sheet molding (E20T, 15 pi, L/D: 20, Collin Co.) was used as the film extruder, and temperature conditions were set as follows: barrel temperatures of 50, 200, 210, and 210° C. and die temperatures of 220, 220, and 230° C. in order from the inlet of the extruder. The pellets were sufficiently dried in an oven at 80° C. for 3 hours or more to eliminate the effect of moisture, and then were fed into the film extruder through the inlet of the film extruder to prepare a film with a uniform thickness of 0.15 T. The temperature of a rear roller was set to 85° C. using water as a medium, and as shown in FIG. 3, the roller was configured such that only one side of a resin extruded through a T-die was in contact with a roll. At this time, the screw RPM of the film extruder was fixed to 100, and the linear velocity of the roll was adjusted so that the film had a thickness of 0.15 T. At this time, the film gloss, and the like of a surface in contact with the first roll among extruded film surfaces were measured.

In addition, melt index was measured using the prepared pellets.

In addition, the prepared pellets were injected at a molding temperature of 230° C. to prepare a specimen for measuring physical properties, and the impact strength, tensile strength, hardness, and injection gloss of the specimen were measured.

Test Examples

The properties of pellets, sheets, and specimens prepared in Examples 1 to 7 and Comparative Examples 1 to 7 were measured according to the following methods, and the results are shown in Table 1 below.
- Melt index (MI): Melt index was measured using the prepared pellets under conditions of 220° C./10 kg according to ASTM D1238.
- Tensile strength (kg/cm$^2$): Tensile strength was measured according to ASTM D638.
- Hardness (R-scale): Hardness was measured according to ASTM D785.

Izod impact strength (kg-cm/cm): Izod impact strength was measured according to ASTM 256.

Injection gloss: Injection gloss was measured at 45° using a VG7000 gloss meter.

Film gloss: Film gloss was measured at 60° using a 0.15 T sheet and a VG7000 gloss meter.

Figure 1:
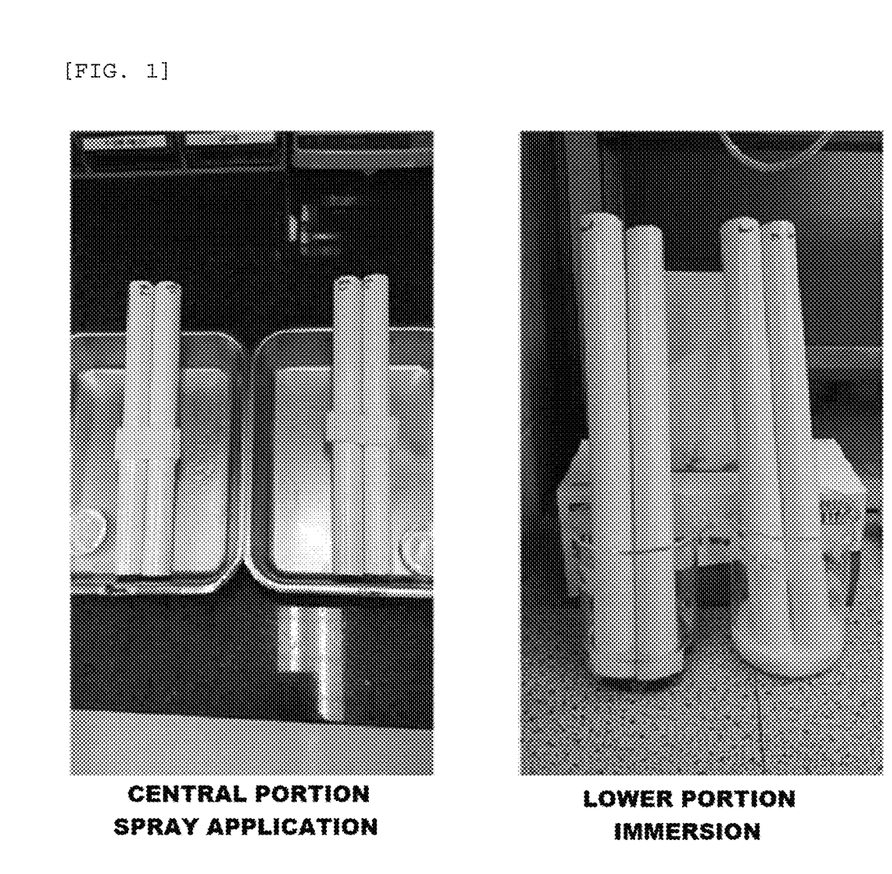
FIG. 1 includes images of coextrusion samples for measuring solvent resistance prepared in Examples and Comparative Examples. The left image shows coextrusion samples each having a spray-coated central portion, and the right image shows coextrusion samples each having a submerged lower portion.

Solvent (disinfectant) resistance: As shown in the left image of FIG. 1, the central portion of a sample was allowed to contact a solvent (product name: Alpet Zero, manufacturer: Clean Peace Co.) consisting of 98% by weight of water, 1% by weight of citric acid, and 1% by weight of malic acid for 15 days, and then the central portion was observed using an optical microscope (×30 magnification) to determine whether cracks occurred. In addition, as shown in the right image of FIG. 1, the lower portion of a sample was immersed in the solvent for 15 days, and then was observed using an optical microscope (×30 magnification) to determine whether cracks occurred. In this case, the sample was manufactured by a pipe extrusion coating method in which the outer surface of a pipe is coated with a plastic raw material through extrusion spraying.

Chemical (pesticide) resistance: As shown in the left image of FIG. 1, the central portion of a sample was allowed to contact, for 15 days, a permethrin-containing emulsion solution (product name: Clean Jet, manufacturer: Green World Farm Co.) in which 0.25 g of permethrin (cis:trans isomer ratio: 25:75) as an insecticidal active ingredient per 100 ml is dissolved, and then the central portion was observed using an optical microscope (×30 magnification) to determine whether cracks occurred. In addition, as shown in the right image of FIG. 1, the lower portion of a sample was immersed in the solvent for 15 days, and then was observed using an optical microscope (×30 magnification) to determine whether cracks occurred.

Weather resistance: Measurement was performed for 2,000 hours according to SAE J1960, and ΔE was calculated using Equation 1 below. Based on the obtained ΔE value, weather resistance was evaluated. As the ΔE value decreases, weather resistance increases.

$$\Delta E = \sqrt{(\Delta a)^2 + (\Delta b)^2 + (\Delta L)^2} \qquad [\text{Equation 1}]$$

TABLE 1

| Classification | | Examples ||||||| Comparative Examples |||||||
|---|---|---|---|---|---|---|---|---|---|---|---|---|---|---|---|
| | | 1 | 2 | 3 | 4 | 5 | 6 | 7 | 1 | 2 | 3 | 4 | 5 | 6 | 7 |
| A-1 | | 27 | 27 | 26 | 32 | 32 | 26 | 28 | 32 | 32 | 29 | 29 | 30 | 39 | — |
| A-2 | | 21 | 21 | 21 | 21 | 21 | 12 | 16 | 21 | 21 | 17 | 17 | — | — | 48 |
| B-1 | | — | — | — | — | — | 32 | 32 | — | — | — | — | 10 | — | |
| B-2 | | 52 | 52 | 53 | 47 | 47 | — | 24 | 47 | — | — | — | — | — | 52 |
| B-3 | | | | | | | | | | | 11 | | | | |
| B-4 | | | | | | | 30 | | 47 | 43 | 54 | 30 | 31 | | |
| B-5 | | | | | | | | | | | | 30 | 30 | | |
| C-1 | | 11 | 9 | 7 | 4 | 4 | 5 | 4 | — | 5 | 4 | 4 | — | 1.5 | 9 |
| C-2 | | | 2 | 2 | | 2 | | 1 | 4 | | 1 | 1 | | | 2 |
| Melt index | | 5.2 | 5.6 | 7.8 | 7 | 6.3 | 9.1 | 5.4 | 4.8 | 12.7 | 8.8 | 12.5 | 12 | 8.2 | 4.5 |
| Impact strength | | 5.2 | 6.4 | 7.2 | 13.2 | 10.4 | 7.0 | 11.1 | 15.5 | 10.3 | 11.2 | 10.0 | 14.4 | 12.7 | 2.3 |
| Tensile strength | | 404 | 414 | 413 | 388 | 385 | 474 | 441 | 408 | 325 | 431 | 422 | 398 | 349 | 401 |
| Hardness | | 94.4 | 96.2 | 95 | 86.9 | 88.2 | 103.7 | 97.7 | 87.8 | 78.1 | 96.4 | 95.2 | 98.2 | 86.8 | 93.7 |
| Injection gloss (45°) | | 16.6 | 20.8 | 28.5 | 23.7 | 23.4 | 22.1 | 26.9 | 73.7 | 37.7 | 31.7 | 35.6 | 27.1 | 48.8 | 28.6 |
| Film gloss (60°) | | 2.8 | 3.3 | 5.0 | 7.2 | 6.8 | 7.1 | 7.3 | 61.9 | 7.1 | 6.5 | 7.8 | 14.9 | 13.9 | 10.1 |
| Solvent (disinfectant) resistance | Central portion application | Good | Good | Good | Good | Good | Good | Good | Good | Good | Good | Fine cracks | Cracks | Medium cracks | Good |
| | Lower portion immersion | Good | Good | Good | Good | Good | Fine cracks | Good | Good | Medium cracks | Medium cracks | Medium cracks | Cracks | Cracks | Good |
| Chemical (pesticide) resistance | Central portion application | Good | Good | Good | Good | Good | Good | Good | Good | Fine cracks | Good | Fine cracks | Cracks | Medium cracks | Good |
| | Lower portion immersion | Good | Good | Good | Fine cracks | Good | Fine cracks | Good | Good | Medium cracks | Fine cracks | Medium cracks | Cracks | Cracks | Good |

As shown in Table 1, it can be confirmed that the thermoplastic resin compositions (see Examples 1 to 7) according to the present invention have excellent injection gloss, film gloss, solvent resistance, and chemical resistance while maintaining mechanical properties, such as impact strength, tensile strength, and hardness, equal or superior to those of Comparative Examples 1 to 7 outside the scope of the present invention.

In particular, it can be confirmed that Examples 1 to 3 and Example 5 including 6 parts by weight or more of a polyamide and Examples 1 to 5 and Example 7 including the SAN resin (B-2) prepared by bulk polymerization have excellent solvent resistance and chemical resistance.

In addition, it can be confirmed that Comparative Examples 6 and 7 including the MABS resin (B-5) instead of the small-diameter ASA resin (A-2) have poor solvent resistance and chemical resistance.

In addition, Comparative Example 1 including 4 parts by weight of PA 6 having a relative viscosity of 2.3 and Comparative Example 7 not including a general-diameter ASA resin have good solvent resistance and chemical resistance. However, Comparative Example 1 has poor gloss, i.e., an injection gloss of 73.7 and a film gloss of 61.9, and Comparative Example 7 has a remarkably low impact strength, i.e., an impact strength of 2.3. Thus, it can be seen that Comparative Examples 1 and 7 do not realize the effects of the present invention.

In addition, Comparative Example 4 has poor film gloss, and Comparative Example 7 has poor impact strength.

Figure 2:
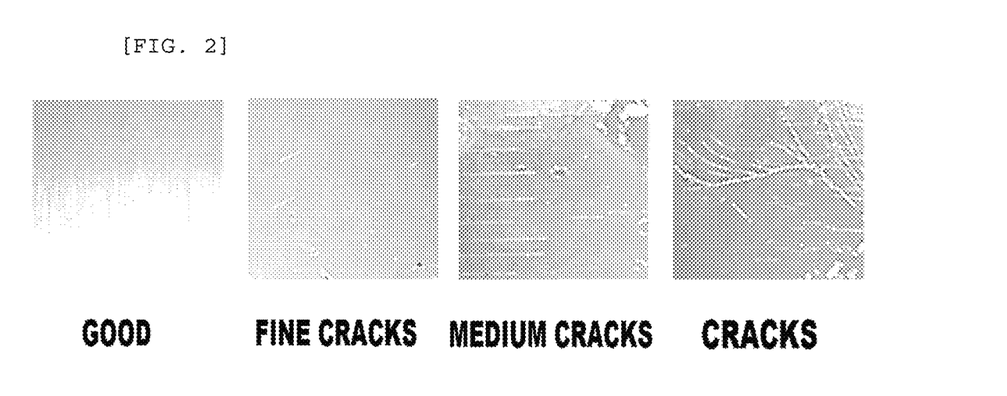
FIG. 2 includes images showing the surfaces of samples prepared in Examples and Comparative Examples taken using an optical microscope (×30 magnification) after the samples are treated for 15 days to measure solvent resistance as shown in FIG. 1.

In addition, referring to the optical microscope image of FIG. 2, the thermoplastic resin compositions (see Examples 1 to 7) according to the present invention maintained good surfaces even when exposed to a solvent and chemicals for a long time. However, in the case of Comparative Examples 1 to 7 outside the scope of the present invention, fine cracks, medium cracks, or cracks were observed on surfaces in contact with a solvent and chemicals. That is, Comparative Examples 1 to 7 exhibited poor solvent resistance and chemical resistance.

The invention claimed is:

1. A thermoplastic resin composition, comprising:
100 parts by weight of a base resin comprising from 10 to 50% by weight of an acrylate-aromatic vinyl compound-vinyl cyanide compound graft copolymer (A-1) containing a first acrylate rubber having an average particle diameter of from 0.3 to 0.5 μm, from 5 to 40% by weight of an acrylate-aromatic vinyl compound-vinyl cyanide compound graft copolymer (A-2) containing a second acrylate rubber having an average particle diameter of 0.05 μm or more and less than 0.3 μm, and from 20 to 65% by weight of an aromatic vinyl polymer (B); and
from 0.5 to 12 parts by weight of a polyamide (C),
wherein the thermoplastic resin composition has a solvent resistance of 15 days or more, wherein the solvent resistance is measured as time when a crack occurs in a presence of a solvent consisting of 98% by weight of water, 1% by weight of citric acid, and 1% by weight of malic acid.

2. The thermoplastic resin composition according to claim 1, wherein the acrylate-aromatic vinyl compound-vinyl cyanide compound graft copolymers (A-1) and (A-2) each comprises
from 40 to 60% by weight of the first and second acrylate rubbers, respectively,
from 20 to 40% by weight of an aromatic vinyl compound, and
from 10 to 20% by weight of a vinyl cyanide compound.

3. The thermoplastic resin composition according to claim 1, wherein the aromatic vinyl polymer (B) comprises one or more selected from the group consisting of an aromatic vinyl compound-vinyl cyanide compound copolymer, a heat-resistant styrene-based resin, and a methacrylate-aromatic vinyl compound-vinyl cyanide compound copolymer.

4. The thermoplastic resin composition according to claim 3, wherein the aromatic vinyl compound-vinyl cyanide compound copolymer comprises
from 65 to 80% by weight of an aromatic vinyl compound and
from 20 to 35% by weight of a vinyl cyanide compound.

5. The thermoplastic resin composition according to claim 3, wherein the aromatic vinyl compound-vinyl cyanide compound copolymer comprises one or more selected from the group consisting of an aromatic vinyl compound-vinyl cyanide compound copolymer having a weight average molecular weight of from 100,000 to 150,000 g/mol and an aromatic vinyl compound-vinyl cyanide compound copolymer having a weight average molecular weight of greater than 150,000 g/mol and 200,000 g/mol or less.

6. The thermoplastic resin composition according to claim 3, wherein the heat-resistant styrene-based resin is an α-methylstyrene-vinyl cyanide compound copolymer.

7. The thermoplastic resin composition according to claim 6, wherein the heat-resistant styrene-based resin has a weight average molecular weight of from 150,000 to 250,000 g/mol.

8. The thermoplastic resin composition according to claim 3, wherein the methacrylate-aromatic vinyl compound-vinyl cyanide compound copolymer comprises from 60 to 85% by weight of methacrylate, from 5 to 30% by weight of an aromatic vinyl compound, and from 5 to 30% by weight of a vinyl cyanide compound.

9. The thermoplastic resin composition according to claim 8, wherein the methacrylate-aromatic vinyl compound-vinyl cyanide compound copolymer has a weight average molecular weight of from 80,000 to 200,000 g/mol.

10. The thermoplastic resin composition according to claim 1, wherein the polyamide (C) comprises nylon6 and nylon66.

11. The thermoplastic resin composition according to claim 10, wherein a weight ratio of the nylon6 to the nylon66 (nylon6:nylon66) is 1:1.1 to 10.

12. The thermoplastic resin composition according to claim 1, wherein the thermoplastic resin composition has a chemical resistance of 15 days or more, and the chemical resistance is measured as time when a crack occurs in a presence of a permethrin-containing emulsion solution in which 0.25 g of permethrin (cis:trans isomer ratio: 25:75) as an insecticidal active ingredient per 100 ml is dissolved.

13. The thermoplastic resin composition according to claim 1, wherein the thermoplastic resin composition has an injection gloss of 30 or less as measured at 45° using a VG7000 gloss meter.

14. A molded article, comprising the thermoplastic resin composition according to claim 1.

15. The molded article according to claim 14, wherein the molded article is an unpainted coated pipe including the thermoplastic resin composition and a steel pipe.

16. A method of manufacturing an unpainted coated pipe, the method comprising:
feeding 100 parts by weight of a base resin comprising from 10 to 50% by weight of an acrylate-aromatic vinyl compound-vinyl cyanide compound graft copolymer (A-1) containing acrylate rubber having an average particle diameter of from 0.3 to 0.5 µm, from 5 to 40% by weight of an acrylate-aromatic vinyl compound-vinyl cyanide compound graft copolymer (A-2) containing acrylate rubber having an average particle diameter of from 0.05 µm or more and less than 0.3 µm, and from 20 to 65% by weight of an aromatic vinyl polymer (B), and from 0.5 to 12 parts by weight of a polyamide (C) into an extruder to prepare pellets; and coextruding the prepared pellets and a steel pipe to manufacture the unpainted coated pipe, wherein the unpainted coated pipe has a solvent resistance of 15 days or more, wherein the solvent resistance is measured as time when a crack occurs in a presence of a solvent consisting of 98% by weight of water, 1% by weight of citric acid, and 1% by weight of malic acid.

* * * * *